(12) United States Patent
Metral et al.

(10) Patent No.: US 7,892,046 B2
(45) Date of Patent: Feb. 22, 2011

(54) TELECOMMUNICATIONS MODULE, COMBINATION OF A TELECOMMUNICATIONS MODULE AND AT LEAST ONE SPLITTER CIRCUIT, AND ASSEMBLY OF AT LEAST TWO TELECOMMUNICATIONS MODULES

(75) Inventors: Guy Metral, Cluses (FR); Gaetan Perrier, Cluses (FR); Pierre Bonvallat, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 465 days.

(21) Appl. No.: 11/719,504

(22) PCT Filed: Nov. 15, 2005

(86) PCT No.: PCT/US2005/041103

§ 371 (c)(1),
(2), (4) Date: May 16, 2007

(87) PCT Pub. No.: WO2006/057842

PCT Pub. Date: Jun. 1, 2006

(65) Prior Publication Data

US 2009/0149083 A1 Jun. 11, 2009

(30) Foreign Application Priority Data

Nov. 24, 2004 (EP) .................. 04027881

(51) Int. Cl.
*H01R 9/22* (2006.01)
(52) U.S. Cl. .............. 439/709; 379/413.04; 379/399.01
(58) Field of Classification Search .............. 439/709, 439/188, 922, 719, 713; 379/413.04, 399.01; 361/199
See application file for complete search history.

(56) References Cited

U.S. PATENT DOCUMENTS

| | | | | |
|---|---|---|---|---|
| 5,494,461 | A | * | 2/1996 | Bippus et al. ............... 439/709 |
| 5,805,404 | A | * | 9/1998 | Kane et al. .................. 361/111 |
| 5,967,826 | A | | 10/1999 | Letailleur |
| 6,438,226 | B1 | * | 8/2002 | Guenther et al. ........ 379/413.04 |
| 7,018,229 | B2 | * | 3/2006 | Otto et al. .................... 439/381 |
| 7,103,150 | B2 | * | 9/2006 | Witty et al. ............... 379/26.01 |
| 7,140,926 | B2 | * | 11/2006 | Bund et al. .................. 439/709 |
| 7,207,818 | B1 | * | 4/2007 | Barthes et al. .............. 439/188 |
| 2003/0002641 | A1 | | 1/2003 | Schmokel |
| 2003/0043970 | A1 | | 3/2003 | Witty et al. |
| 2005/0085119 | A1 | | 4/2005 | Schluter et al. |
| 2007/0002542 | A1 | * | 1/2007 | Denter et al. ............... 361/728 |

(Continued)

FOREIGN PATENT DOCUMENTS

AU 756261 8/2000

(Continued)

*Primary Examiner*—Xuong M Chung Trans
(74) *Attorney, Agent, or Firm*—Janet A. Kling

(57) ABSTRACT

A telecommunications module (10) has contacts (12, 14, 16) for connecting wires therewith, the contacts (12, 14, 16) being arranged in a number of substantially parallel rows, which is three or a multiple of three, at least one row of contacts (12, 14, 16) which is assigned to transmit a specific signal, such as a POTS, a line or a DSLAM signal, being assigned to transmit a different signal than any adjacent row of contacts within each multiple of three rows.

12 Claims, 2 Drawing Sheets

U.S. PATENT DOCUMENTS

2008/0240162 A1* 10/2008 Perrier ..................... 370/493

FOREIGN PATENT DOCUMENTS

| | | |
|---|---|---|
| EP | 0 101 650 A2 | 2/1984 |
| EP | 0 522 540 A1 | 1/1993 |
| EP | 0 909 102 A2 | 4/1999 |
| EP | 1 578 145 A1 | 9/2005 |
| FR | 2 770 073 | 4/1999 |
| WO | WO 03/061303 A2 | 7/2003 |

* cited by examiner

TELECOMMUNICATIONS MODULE, COMBINATION OF A TELECOMMUNICATIONS MODULE AND AT LEAST ONE SPLITTER CIRCUIT, AND ASSEMBLY OF AT LEAST TWO TELECOMMUNICATIONS MODULES

CROSS REFERENCE TO RELATED APPLICATIONS

This application is a national stage filing under 35 U.S.C. 371 of PCT/US2005/041103 filed Nov. 15, 2005, which claims priority to EP Application No. 04017881.4, filed Nov. 24, 2004, the disclosure of which is incorporated by reference in their entirety herein.

TECHNICAL FIELD

The invention relates to a telecommunications module, a combination of a telecommunications module and at least one splitter circuit as well as an assembly of at least two telecommunications modules.

BACKGROUND

In the field of telecommunications, numerous customers are connected with the switch of a telecommunications company via telecommunications lines. The customers can also be called subscribers. The switch is also called an exchange. Between the subscriber and the switch, sections of the telecommunications lines are connected with telecommunications modules. The telecommunications modules establish an electrical connection between a wire which is attached to the telecommunications module at a first side, and another wire which is attached to the telecommunications module at a second side. Plural telecommunications modules can be put together at a distribution point, such as a main distribution frame, an intermediate distribution frame, an outside cabinet or a distribution point located, for example, in an office building or on a particular floor of an office building. To allow flexible wiring, some telecommunications lines are connected with first telecommunications modules in a manner to constitute a permanent connection. Flexibility is realized by so-called jumpers, which flexibly connect contacts of the first telecommunications module with contacts of a second telecommunications module. These jumpers can be changed when a person moves within an office building to provide a different telephone (i.e. a different telephone line) with a certain telephone number, which the relocated person intends to keep.

Recently, ADSL-technology has spread widely in the field of telecommunications. This technology allows at least two different signals to be transmitted on a single line. This is achieved by transmitting the different signals at different frequencies along the same line. The signals are combined at a particular point in the telecommunications line and split at another point. In particular, at the subscriber side, voice and data signals, which are separate, are combined and sent to the central office via the same line. In the central office the combined signal is split. For the transmission of voice and data signals to the subscriber, separate voice and data signals are combined at the central office, sent to the subscriber and split at the subscriber side. After splitting the signal, the so-called POTS-signal (plain old telephone service) can be used to transmit voice signals. The remaining part of the split signal can be used to transmit data, for example. So-called splitters, which are used to split or combine the signal, can generally be arranged at any distribution point. In this context, a POTS wire or POTS jumper indicates a wire, which is connected with an exchange of the telecommunications company. Furthermore, a line connection indicates a wire, which leads to the subscriber or customer. Finally, as discussed in more detail below, a DSLAM-wire means a wire which is connected with a DSLAM and thus, can, for example, transmit data. A DSLAM (Digital Subscriber Line Access Multiplexer) processes the data signal.

WO 2002/076109 describes a splitter being integrated in a main distribution frame. An integrated assembly comprises three arrays of contacts, a first array being connected with a line, a second array being connected with POTS and a third array being connected with a DSLAM. The contacts of the assembly are connected with splitter circuits to split a signal, which is transmitted by the line, into a POTS and a DSLAM signal. Whereas this known assembly provides increased versatility due to an additional array of contacts, this additional array of contacts might not be necessary in all cases so that the density, which is achieved by the known assembly, can be improved.

The Applicant's EP 04 006 530 describes an assembly of three telecommunications modules, each having two rows of contacts.

SUMMARY OF THE INVENTION

The invention provides a telecommunications module which achieves a simple design as well as a high density in connecting telecommunications lines carrying line, POTS and DSLAM signals which are connected with contacts of telecommunications modules. Furthermore, a combination of such a telecommunications module and at least one splitter circuit as well as an assembly of at least two telecommunications modules are provided.

The telecommunications module can be a "standard module", as known to those skilled in the related field, to the extent that the module comprises a housing usually of insulating material, and, typically, of plastic. The telecommunications module, in particular the housing thereof, can have portions, which are suitably designed so as to allow the module to be attached to a carrier, a rack or a similar device in the field of telecommunications. These portions of the telecommunications module can, for example, be constituted by latch hooks or snap fasteners. The telecommunications module can, moreover, comprise hooks, wire guiding channels or any other structures as known to those skilled in the art, in order to allow wires to be guided in a suitable manner. The housing of the telecommunications module can be open and/or accessible at one or more locations in order to allow exterior objects, such as other modules, splitter circuits, overvoltage or overcurrent protectors, to be connected with contacts of the telecommunications module. Furthermore, one or more splitter circuits can be integrated into the telecommunications module as described above.

In particular, the telecommunications module comprises contacts which are exposed so as to allow the connection of wires therewith. The contacts can be exposed at a wide and shallow front side so that the module can be considered a strip-type-module. Such a module is, for example, commercially available from Quante, 3M Telecommunications of Neuss, Germany under the designation SID. However, the module can also have a block-type configuration. In any case, wires, such as the above-described POTS, line and DSLAM wires, can be connected with the contacts of the telecommunications module. The contacts can be IDCs (insulation displacement contacts), wire wrap contacts or any other type of contacts. Furthermore, several contacts can be grouped together to constitute a connector, to which a complementary connector, having the same number of contacts grouped together, is connectable.

In the novel telecommunications module, the contacts are arranged in a number of substantially parallel rows which is three or a multiple of three. This represents an approach which is significantly different from previously known telecommunications modules, which generally have either two parallel rows of contacts or a number of rows of contacts, which is a multiple of two. This conventional approach can also be seen from the applicant's EP 04 006 530, in which an assembly of three telecommunications modules, each having two rows of contacts, is described. Compared therewith, the telecommunications module described herein provides advantages regarding the complexity of the basic structure of a telecommunications module which is used to allow those connections, which are in particular required for ADSL-technology. This is because, as described in more detail below, the three, six, nine, etc., rows of contacts can be used to establish a row of POTS-connections, a row of line-connections and a row of DSLAM-connections. A row of contacts is generally constituted by two or more contacts, which are assigned to transmit the same, specific type of signal. If the telecommunications module comprises six or more rows of contacts, the described order of rows of contacts will be repeated one or more times. Hereinafter, the novel telecommunications module will mainly be described on the basis of an embodiment, which comprises three rows of contacts. However, corresponding considerations apply to those embodiments, which comprise six or more rows of contacts. For the sake of simplicity of the explanation, the description will be given with regard to the embodiment having three rows of contacts in order to avoid the necessity of distinguishing between the different embodiments when the features and advantages of the novel telecommunications module are described.

By integrating three rows of contacts in the telecommunications module, a single telecommunications module is used as the basis for all necessary connections. In particular, if a distribution point, as described above, is prepared to enable ADSL service, a minimum number of connections need to be prepared. Basically, by using the telecommunications module described herein, a single row of each of the above-mentioned contacts (POTS, line and DSLAM contacts) is established. In contrast, it is described in the applicant's EP 04 006 530 that two rows of each of the described contacts are established.

Furthermore, the telecommunications module described herein achieves a high density of connections which can be established. In other words, many connections can be established in a comparatively small space. In particular, reference can be made to the applicant's EP 04 006 530, in which details regarding the density are given. These details also apply to the telecommunications module described herein so that these details are incorporated herein by the reference. This is also the case for any specific aspects regarding the wiring, the basic structure of the telecommunications modules and the specific connections which are made with specific contacts of the telecommunications module. These details are incorporated herein by reference to the mentioned application in order to avoid a repetition of the detailed description.

In summary, the telecommunications module provides an efficient basis for the necessary connections in a distribution point, with which an ADSL service is to be provided. Furthermore, the telecommunications module described herein is advantageous in that only one module has to be handled in a situation where the arrangement of modules in a distribution point has to be changed, compared to an assembly of two or more modules which might have to be handled together when the need for adjustment arises. Finally, building up a distribution point involves a lower number of modules and, therefore, costs are saved. Furthermore, a single type of module can be used, which reduces the number of different parts and components and, thus, adds to the saving of costs.

It is also conceivable that the telecommunications module comprises a multiple of three, as regards the number of rows of contacts. Such a modification is considered a novel type of telecommunications module, in particular, as far as single rows are adapted to connect either POTS or lines or DSLAM wires therewith. For example, a module having six rows of contacts can have rows in the following order: POTS, line, DSLAM, POTS, line, DSLAM. As an alternative, the order of rows could be: POTS, line, DSLAM, DSLAM, line, POTS. For any higher number of rows of contacts, such as nine, twelve and so on, the above described symmetrical and asymmetrical arrangements, respectively, can be extended to the further rows. Such a type of module could be called a telecommunications block. Summarizing, the telecommunications module having exactly three rows of contacts is novel only for this number of rows. An embodiment which has six rows of contacts can be considered novel due to the assignment of at least one row of contacts to a particular service (POTS or line or DSLAM), and the assignment of any adjacent row to a different service. Any modules having rows of contacts with a number of nine or more, being an odd number and a multiple of three, is novel due to this number of rows of contacts. The latter embodiments should be considered subject matter contained in this application.

Generally, the rows of contacts of the telecommunications module described herein can be adapted to transmit any type of desired service or signal. However, special advantages, particular with regard to ADSL service, are achievable, when the contacts of the first row are adapted to transmit a POTS-signal, the contacts of a second row are adapted to transmit a line-signal, and the contacts of a third row are adapted to transmit a DSLAM-signal. In such a configuration, the telecommunications module provides all necessary connections to provide ADSL service to a particular subscriber so that an efficient basis for this service is created. In particular, the contacts can be assigned to transmit the described signals which can be taken from the fact that the telecommunications module is combined with one or more splitter circuits, which receives and outputs the specific signal to the specific contacts of the telecommunications module.

As regards the order of rows of contacts, it is currently preferred to provide the row of POTS-contacts, line-contacts and DSLAM-contacts in this order. This represents an order which allows the desired connections to be made in a well defined and logical manner.

In the telecommunications module at least two contacts of at least two rows can be connectable with and disconnectable from each other at a disconnection point. In particular, contacts of a row of POTS-contacts, on the one hand, and a row of line-contacts, on the other hand, can be provided with such a disconnection point. In this manner, a so-called lifeline service can be provided by connecting the mentioned contacts with each other (without splitting to a DSLAM), and thus provide POTS service alone.

In order to allow well defined guiding and/or routing of the wires to the contacts of the telecommunications module, the module can comprise wire guides. These can be formed as hooks and/or open or closed wire guiding channels. In particular, the wire guides can be formed in accordance with EP 00 101 650 of Quante AG and/or WO 2003/061303 of the applicant.

As regards the specific structure of the telecommunications module, the contacts for connecting wires therewith can be exposed at a front side and the telecommunications module can be accessible for connecting the contacts from a rear side thereof. Thus, the telecommunications module can be open and/or accessible at a rear side in order to allow external devices to be connected with the contacts from the rear side. At the front side of the modules, the contacts thereof, which are adapted to connect wires therewith, are exposed. In certain situations, these wires need to be manipulated, for example to be taken out and connected with other contacts. Furthermore, it might be necessary to insert test plugs or protection components, such as over-voltage or over-current protectors from the front side. These processes are facilitated by the described structure, wherein the rear side is accessible to allow the insertion of other components, such as the splitter circuit, from the rear side. Thus, any splitter components are kept away from the front side so that the reliability of the installation as a whole, i.e. both of the splitter circuit and the telecommunications lines, is improved. The module can, furthermore, be open, i.e. accessible at its front side so as to allow the insertion of further components, such as protection modules and/or test plugs. Thus, these modules can be inserted into the module with one or more splitter circuits being unaffected, as these are inserted from a side other than a front side.

In the last described embodiment, the telecommunications module is particularly suitable for being combined with at least one splitter circuit. As will be apparent to those skilled in the field, splitter circuits comprise suitable filters, such as low pass and high pass filters, to split the combined signal as described above. Furthermore, although reference has been made to "splitting" a signal, the basic requirements are essentially identical at that point of the telecommunications system where the POTS and DSLAM signals are combined with each other so as to be fed to the line. Thus, a reference to a "splitter" may be understood in appropriate circumstances to be a reference to what could be called a signal "combiner". The splitter circuits, as described above, comprise an electrical circuit which splits or combines a signal. This signal is transmitted via contacts of the splitter circuit, which are connected with contacts of the assembly. The contacts of the assembly, which receive, for example a DSLAM-signal from the splitter, are, therefore, adapted to transmit the DSLAM-signal. Correspondingly, a pair of wires, which leads to the DSLAM will be connected with these contacts of the assembly. Corresponding considerations apply to those contacts which are described to be adapted to transmit the line and the POTS-signals. In particular, the described combination of a telecommunications module and at least one splitter circuit can be built up step by step by adding splitter circuits as required. The splitter circuits can be integrated in an assembly which has plural splitter circuits, possibly all of the splitter circuits which are required for the module described above. However, the splitter circuits can also be provided separate from each other, such that one particular circuit has three pairs of two contacts, in total six contacts, each of which is connected with a suitable contact of the module. Thus, such a splitter circuit, which can be provided in a suitable integrated, separate component, such as a splitter block, can be called a single line splitter. With this measure, only that splitter, which is connected with lines of one particular subscriber, can be removed from the assembly or added thereto, in case of problems arising, or in case a subscriber, who previously had only POTS service, wishes to use ADSL-service in addition. As an example, the splitter circuits described in Applicant's EP 04 006 530 mentioned above can be used for the module described herein.

Generally, the telecommunications module described herein can be used by itself, i.e., a distribution point can be equipped with this telecommunications module step by step in order to be prepared to provide ADSL services to a growing number of subscribers. However, an assembly comprising at least two such telecommunications modules will constitute an assembly in a distribution point which establishes more connections in a first step and allows an order in the rows of contacts which is comparable to known assemblies having three modules and with which those people who connect the wires are familiar.

In such an assembly, at least two telecommunications modules can be arranged symmetrically about an imaginary plane arranged between the telecommunications modules. In this case, the order of rows of contacts can, for example, be: POTS, line, DSLAM, DSLAM, line, POTS. This corresponds to an order which is already present in similar assemblies so that such a configuration can be combined with already established assemblies without disturbing a certain order of connections.

However, in specific cases, in an assembly of at least two telecommunications modules, at least two such modules can be arranged with an identical orientation. In other words, this would produce a succession of connections such as POTS, line, DSLAM, POTS, line, DSLAM and so on. In this case, at least two telecommunications modules are arranged with an identical orientation so that the connections and the wiring can be repeated for two or more telecommunications modules. Any splitter circuits, which are combined with the telecommunications modules of the above described assemblies, are suitably inserted into the telecommunications modules. Thus, in the above first described embodiment, the splitter circuits will be arranged symmetrically. In the above second described embodiment also the splitter circuits will have an identical orientation corresponding to the "stacked arrangement" of the telecommunications modules.

BRIEF DESCRIPTION OF THE DRAWINGS

Hereinafter, the invention will be described by non-limiting examples thereof with reference to the drawings, in which.

DESCRIPTION OF PREFERRED
EMBODIMENTS OF THE INVENTION

Figure 1:
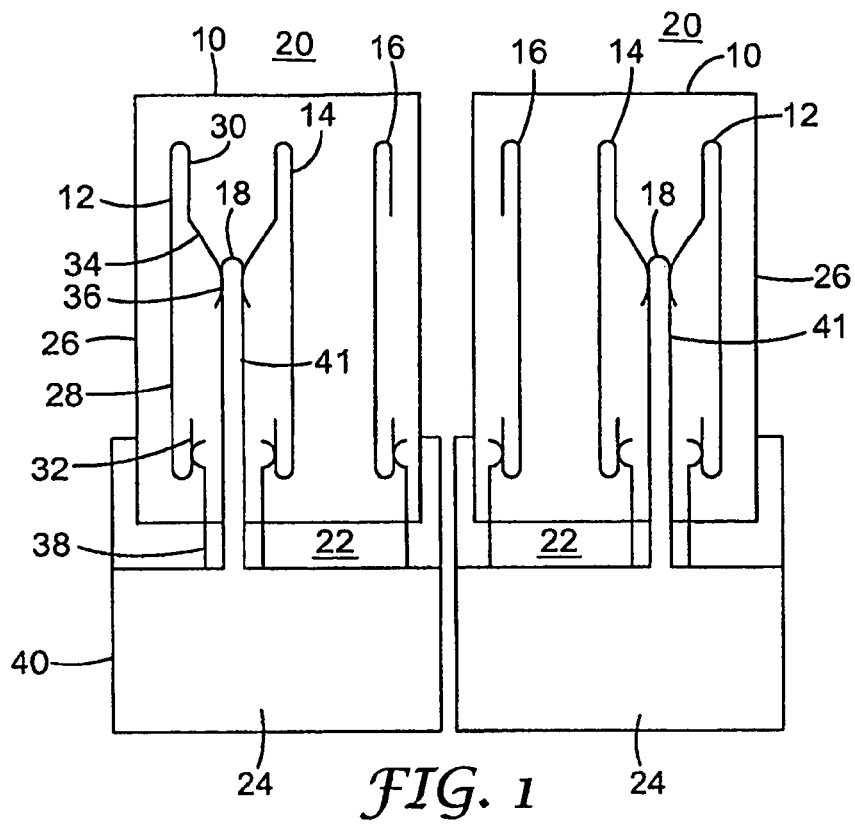
FIG. 1 shows a schematical sectional side view of an assembly as described herein in a first embodiment.

FIG. 1 schematically shows, in a sectional side view, an assembly of two telecommunications modules 10 as described herein. Each module 10 has a certain extension in the direction perpendicular to the plane of FIG. 1. In the sectional view, a single contact 12, 14, 16 is visible for each telecommunications module 10, whereas each of these contacts represents, due to the described extension perpendicular to the plane of the drawing, a row of contacts. In other words, further contacts 12, 14, 16 are present "in front of" and "behind" the contacts shown in FIG. 1.

In FIG. 1 a housing, usually of plastic, of the telecommunications module is indicated at 26. The rows of contacts 12, 14, 16 are integrated in this housing. At a front side 20, the contacts 12, 14, 16, in particular their front ends, are exposed. This allows the connection of wires therewith. In the embodiment shown, contacts 12 are contacts, which are adapted to transmit POTS-signals. Thus, they can be called POTS-contacts 12. Contacts 14 are adapted to transmit a line-signal so that they can be considered line-contacts 14. Finally, contacts 16 are adapted to transmit a DSLAM-signal. These alignments of line types with the contacts are mentioned just by way of example, and may be selected in any desired order, or with any desired type of signal. Therefore, they can be called DSLAM-contacts 16. In total, three rows of contacts 12, 14, 16 are arranged in three substantially parallel rows in the novel telecommunications module 10.

It can, moreover, be taken from the drawing that the POTS-contacts 12 and the line contacts 14 are connectable with and disconnectable from each other at a disconnection point 18. In the case shown, all contacts 12, 14, 16 comprise, firstly, a main portion 28) which generally extends, in the shown embodiment, in a direction from the front 20 to a rear side 22. In the vicinity of the front side 20, a bent back portion 30 is formed. It should be mentioned that the contact shown will usually have an extension of a few millimetres in the direction perpendicular to the plane of the drawing. Thus, a slit or slot (which is not visible in the view of FIG. 1) can be formed at a position along this extension perpendicular to the plane of the drawing. This slit extends with its depth from the front 20 in the direction of the rear side 22 so as to allow the insertion of wires (which will generally extend horizontally as seen in FIG. 1) into the described slit.

The above description is related to an IDC-contact. However, it should be mentioned that some or all of the contacts can also be formed as wire wrap contacts, around which the exposed core of an insulated wire can be wrapped. Furthermore, the general structure of the contacts has been described above with regard to the POTS-contact 12 of the left telecommunications module 10. However, the structure of the line-contacts 14 is generally the same. As can be taken from the drawing, the line-contacts 14 is arranged symmetrical with regard to an imaginary plane, which is substantially parallel to the main portion 28 and contains the disconnection point 18. However, the structure of the line-contacts 14 and the DSLAM-contacts 16 can also be different from that of the POTS-contacts 12. Moreover, as regards the main portion 28 and the bent back portion 30 at the front side, as well as a second bent back portion 32 at the rear side, the structure of the DSLAM-contacts 16 is generally the same, in the embodiment shown, as that of the POTS-contacts 12.

Figure 3:
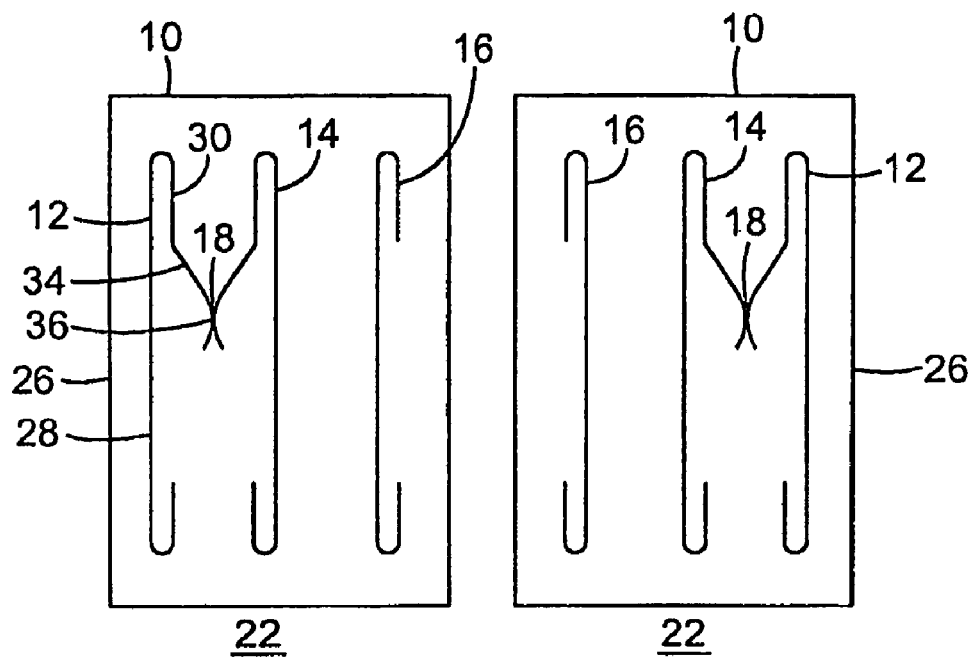
FIG. 3 shows a schematical sectional side view of the assembly of FIG. 1 without the splitter circuits.
Figure 4:
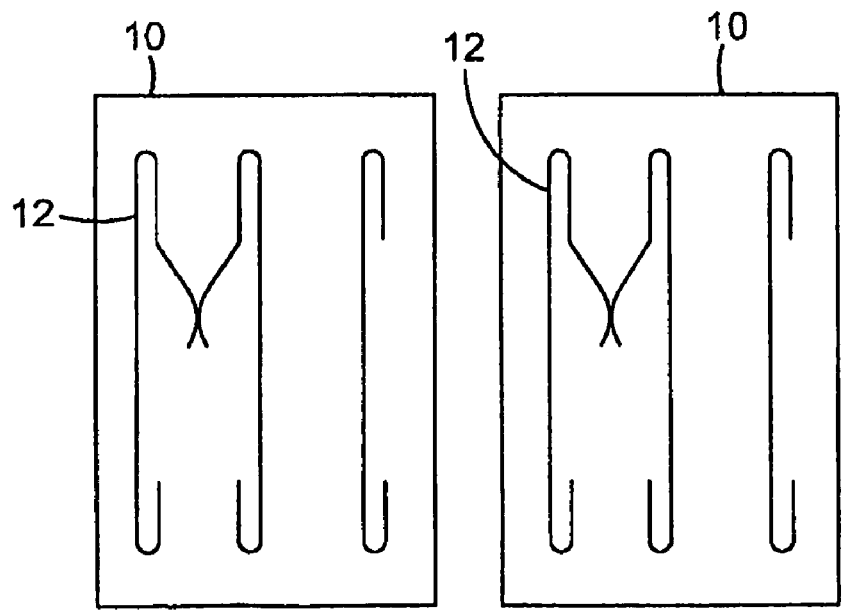
FIG. 4 shows a schematical sectional side view of the assembly of FIG. 2 without the splitter circuits.

However, in the POTS-contacts 12 and the line-contacts 14, an inclined tab 34 is formed extending from the bent back portion 30 at the front side. In the embodiment shown, the tab 34 forms a vertex 36, so that the vertices of contacts 12 and 14 can meet at the disconnection point 18. In particular, these will elastically meet at this disconnection point so that a connection can be made, as shown in FIGS. 3 and 4. As an alternative, any suitable device, such as a plug, in particular as protruding portion 41 thereof, can be inserted, either from the front 20 or, as shown, the rear side 22 in order to separate the tabs 34 from each other. In the embodiment shown, the protruding portion 41 is formed as a part of the splitter circuit 24, in particular of the housing thereof, which can, for example, be made of plastic. However, the protruding portion 41 or a suitable plug could also be provided separate from the splitter circuit 24 and could be inserted from the front 20.

In the embodiment shown, the telecommunications modules 10 are open and accessible from a rear side. In particular, a splitter circuit 24 can be inserted from the rear side 22. As described above, the splitter circuit can be integrated into a suitable housing, which can be formed to partially encompass the housing 26 of the telecommunications module 10. The splitter circuit contains filters or other electronic components, which will be necessary in order to split or combine a signal received from or sent to the line-contact 14, the POTS-contact or the DSLAM-contact. For this purpose, the splitter circuit comprises contacts 38 extending from a housing 40, which are adapted to be inserted into the telecommunications module 10 in order to establish connections with contacts 12, 14, 16 of the telecommunications module 10, in particular at the bent back portion 32 at the rear side of the contacts. In the embodiment shown, the splitter contacts 38 have a bulge which extends towards the bent back portion 32 of the respective contact of the telecommunications module.

As regards an assembly of two telecommunications modules 10, as shown in FIG. 1, FIG. 1 shows an embodiment, in which telecommunications modules 10 are arranged symmetrically about a plane arranged between the telecommunications modules, i.e. a vertical plane in FIG. 1. As can be taken from FIG. 1, the telecommunications modules 10 are identical regarding their general structure. However, they are arranged in a different orientation, so that POTS-contacts 12 are at the left side in the left telecommunications module 10 and at the right side in the right telecommunications module 10. The orientation of the right telecommunications module 10, as compared to the orientation of the left telecommunications module 10, can be described to be "turned" by 180 degrees about a vertical axis. Thus, the order of rows for this assembly of two telecommunications modules is: POTS, line, DSLAM, DSLAM, line, POTS. This represents a convenient arrangement of contacts, with which individuals, who have the task of contacting wires with the contacts, are familiar. In accordance with the orientation of the telecommunications modules, also the filter circuits 24 are arranged in a symmetrical manner. The splitter circuit 24 as such can be identical for both telecommunications modules 10.

Figure 2:
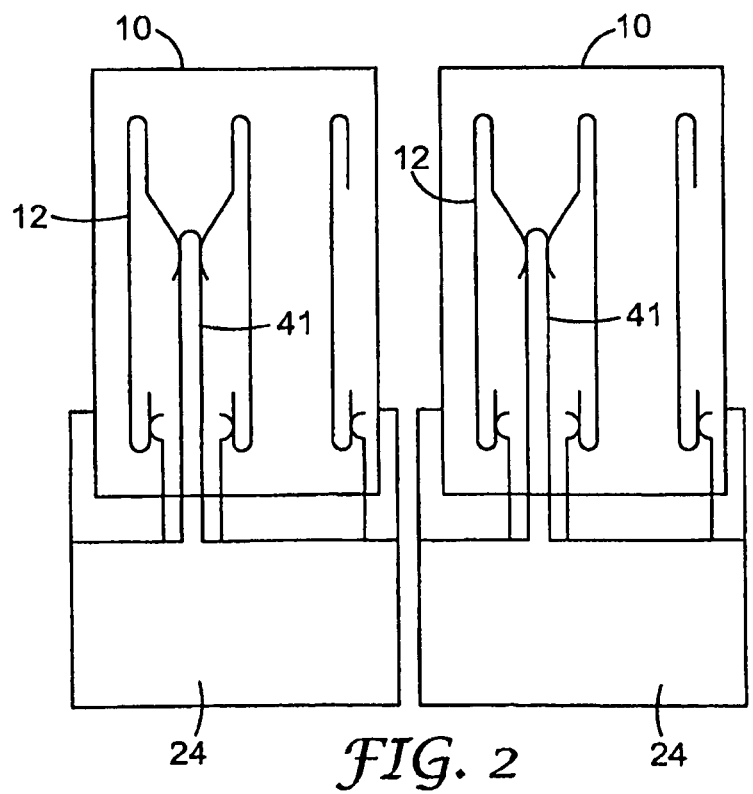
FIG. 2 shows a schematical sectional side view of an assembly as described herein in a second embodiment.

In contrast, FIG. 2 shows an assembly of two telecommunications modules 10, which are, again, identical with regard to their structure, and are, furthermore, identical with the telecommunications module 10 shown in FIG. 1. However, in the assembly of FIG. 2, they are arranged in an identical orientation, i.e. the POTS-contacts 12 are at the left side for both telecommunications modules 10. Same considerations apply for the other contacts of the telecommunications modules as well as the splitter circuits 24. In other words, also the splitter circuits can be identical to each other and identical to those shown in FIG. 1. However, in FIG. 2, they are also inserted into the telecommunications modules with an identical orientation. In summary, the assembly of FIG. 2 provides an order of contacts, which is POTS, line, DSLAM, POTS, line, DSLAM. This can be advantageous in some cases. In particular, any individual intending to connect wires with the contacts of the telecommunications modules, does not have to pay attention to the orientation of the specific module. Rather, the orientation will be the same for two modules, as shown in FIG. 2, or even more modules, which will typically be present in a distribution point. Moreover, also with regard to the insertion of the splitter circuits, an identical orientation will facilitate the operation of inserting the splitter circuits into the telecommunications modules.

It should finally be mentioned that, although this is not shown in the figures, the telecommunications modules 10 comprise suitable portions, such as latch hooks, which allow their attachment to suitable carriers, racks or similar devices, as known in the field of telecommunications. In particular, the modules can be arranged in a distribution point in an orientation, which differs from the orientation shown in the figures, by a rotation of 90 degrees about a horizontal axis.

FIG. 3 shows the assembly of telecommunications modules 10 as shown in FIG. 1, without any splitter circuits 24 combined therewith. In this situation, the tabs 34 of contacts 12 and 14 meet at their vertex 36 so that a connection is made at this point. As contacts 12 are assigned to transmit a POTS-signal, and contacts 14 are assigned to transmit a line signal, a so-called lifeline service can be provided, i.e. without transmitting a DSLAM-signal. In such a situation, contacts 16 can, for example, be used for grounding or earth connection, as well as display or monitoring purposes.

This also applies to the alternative assembly as shown in FIG. 4, in which the telecommunications modules 10 have the same orientation, whereas they are symmetrical to each other with regard to a vertical plane in the embodiment of FIG. 3.

The invention claimed is:

1. A telecommunications module having contacts for connecting wires therewith, wherein the contacts are arranged in a set of three parallel rows, wherein each row of contacts transmits a specific signal that is different from the signal transmitted by any adjacent row of contacts within the set of three parallel rows of contacts, wherein the specific signal is one of a POTS signal, a line signal and a DSLAM signal and wherein two contacts in two adjacent rows are connected to each other at a disconnection point.

2. The telecommunications module in accordance with claim 1, wherein the contacts of at least one first row are assigned to transmit a POTS-signal, the contacts of at least one second row are assigned to transmit a line signal, and the contacts of at least one third row are assigned to transmit a DSLAM-signal.

3. The telecommunications module in accordance with claim 2, wherein the rows of contacts are arranged in the following order: first row, second row and third row.

4. The telecommunications module in accordance with claim 1, wherein the contacts are exposed at a front side, and the telecommunications module is accessible for contacting the contacts from a rear side thereof.

5. The telecommunications module in accordance with claim 1, in combination with at least one splitter circuit.

6. An assembly comprising at least two telecommunications modules in accordance with claim 5.

7. The assembly of claim 6, wherein at least two telecommunications modules are arranged symmetrical about an imaginary plane arranged between the telecommunications modules.

8. The assembly in accordance with claim 6, wherein at least two telecommunications modules are arranged with an identical orientation.

9. The telecommunications module in accordance with claim 1, in combination with at least one splitter circuit.

10. An assembly comprising at least two telecommunications modules in accordance with claim 9.

11. The assembly of claim 10, wherein at least two telecommunications modules are arranged symmetrical about an imaginary plane arranged between the telecommunications modules.

12. The assembly in accordance with claim 10, wherein at least two telecommunications modules are arranged with an identical orientation.

* * * * *